United States Patent [19]

Ritzie

[11] 4,130,287

[45] Dec. 19, 1978

[54] MECHANICAL SEAL ASSEMBLY WITH FLUSHING MEANS

[75] Inventor: Robert H. Ritzie, Mystic, Conn.

[73] Assignee: The Dow Chemical Company, Midland, Mich.

[21] Appl. No.: 853,938

[22] Filed: Nov. 23, 1977

[51] Int. Cl.² ............................................. F16J 15/36
[52] U.S. Cl. ........................................ 277/12; 277/24; 277/59; 277/65; 277/88; 308/187.1
[58] Field of Search ..................... 277/24, 12, 42, 43, 277/15, 59, 65, 70, 71, 72 R, 74, 79, 81 R, 88, DIG. 4; 308/187.1, 187.2

[56] References Cited

U.S. PATENT DOCUMENTS

| | | | |
|---|---|---|---|
| 2,688,520 | 9/1954 | Covington | 277/59 X |
| 2,723,868 | 11/1955 | Hartranft | 277/81 X |
| 3,484,113 | 12/1969 | Moore | 277/65 X |
| 3,643,964 | 2/1972 | Snelling et al. | 277/24 |
| 3,943,717 | 3/1976 | Schexnayder | 277/59 X |
| 4,062,549 | 12/1977 | Kemp | 277/12 |
| 4,071,253 | 1/1978 | Heinen et al. | 277/88 X |

Primary Examiner—Robert S. Ward, Jr.

[57] ABSTRACT

A reliable, long-wearing mechanical seal for a shaft entering a vessel is prepared employing two bellows seals in tandem and providing a path for a flushing fluid between the bellows seals.

3 Claims, 1 Drawing Figure

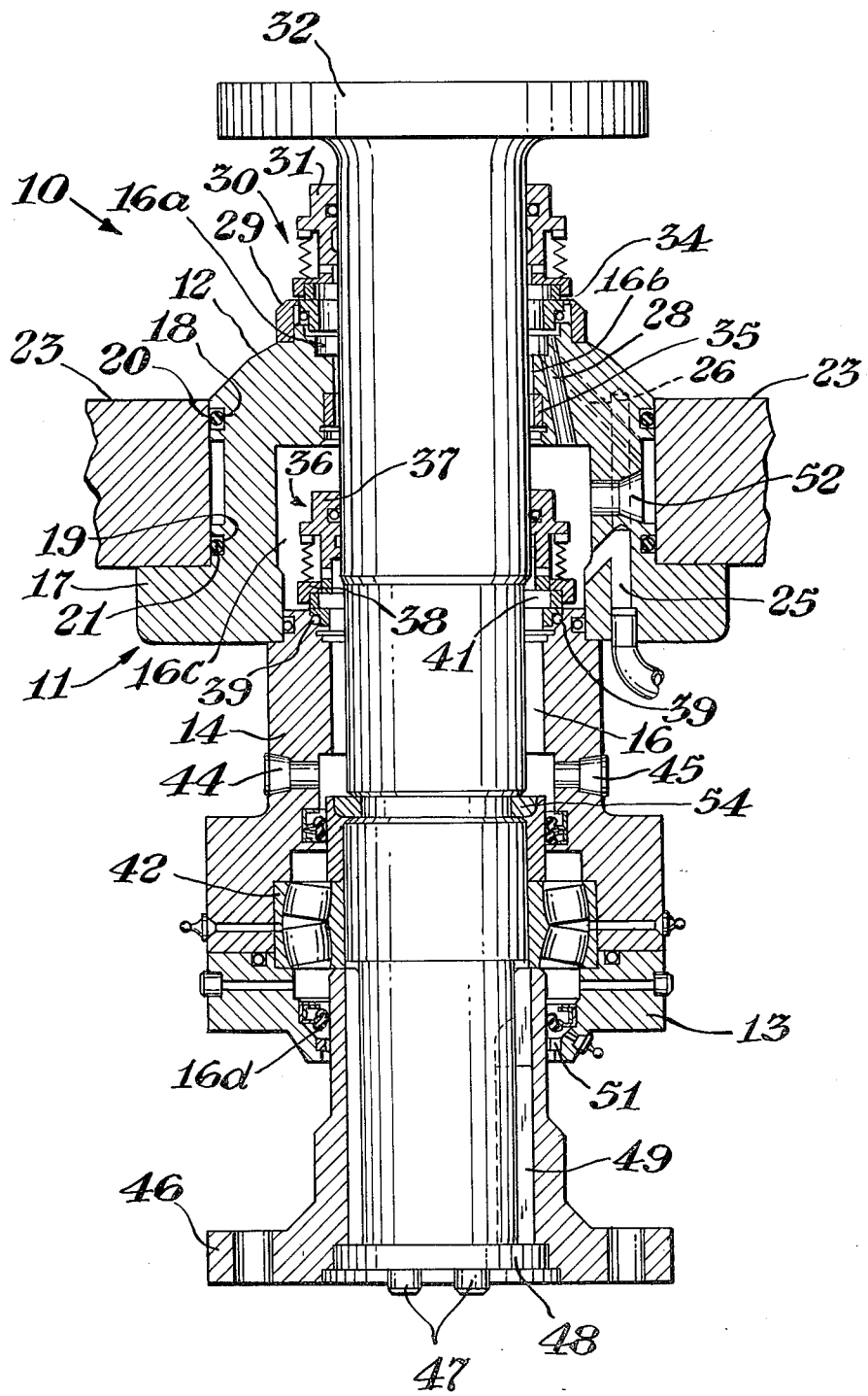

MECHANICAL SEAL ASSEMBLY WITH FLUSHING MEANS

Mechanical seals on rotating shafts entering vessels have provided considerable difficulty over the years. Such seals are often subject to excessive wear requiring frequent replacement or maintenance. Oftentimes, such seals are not tolerant of run out or eccentricity in the shaft. Sometimes, the sealing surfaces are positioned in such a manner that they are subjected to dirt which tends to accumulate around the seals, particularly where a shaft enters a vessel vertically at the bottom. Oftentimes, bearings adjacent seals are subject to corrosion or fouling from material passing through the seal.

It would be desirable if there were available an improved mechanical seal assembly suited for use with liquid-containing vessels.

It would also be desirable if there were available an improved mechanical seal assembly suitable for use with liquid-containing vessels wherein the sealing assembly is disposed at the bottom of such a vessel.

It would also be desirable if there were available an improved seal assembly suitable for use in the bottom of a vessel wherein the sealing surfaces were not subjected to significant amounts of solid contaminants.

These benefits and other advantages in accordance with the present invention are achieved in a mechanical seal assembly for the transfer of rotary motion through the wall of a vessel, the assembly comprising a housing, the housing defining a vessel engaging means and a generally, centrally-disposed passageway, the housing having a first or inner end and a second or outer end, the passage extending between the first and second ends in a direction generally normal to the vessel engaging means, a rotatable shaft disposed within the housing, a first bellows seal in operative engagement with the shaft and inner end of the housing, a second bellows seal disposed generally, centrally within the housing, the first and second bellows seals having the bellows supported on a shaft and both bellows resiliently tensioned in a like direction, a generally annular passage defined by the shaft and the housing extending between the two bellows seals, the housing defining fluid inlet and outlet means in communication with the annular passage, the inlet and outlet means being disposed generally between the vessel engaging means and the second end, a self-aligned bearing disposed generally adjacent the second end of the housing and rotatably supporting the shaft therein.

These benefits and other advantages in accordance with the present invention will become more apparent from the following specification taken in connection with the drawing wherein:

The FIGURE shows a partly-in-section view of a seal assembly in accordance with the present invention in engagement with a vessel.

In the FIGURE, there is schematically depicted a shaft seal assembly in accordance with the present invention generally designated by the reference numeral 10. The assembly 10 comprises in cooperative combination a housing 11 having a first end 12 and a second end 13. The housing 11 comprises three main parts: a first end portion 12, a central portion 14 and the second end 13. The housing 11 defines a passageway 16 which extends entirely therethrough from the first end 12 to the second end 13. The passageway 16 has zones of varying diameter. The first end 12 adjacent the central portion 14 defines a vessel engaging means or circumferential flange 17 and two annular grooves 18 and 19 in which are disposed O-rings 20 and 21 to sealingly engage a vessel 23. The flange or vessel engaging means 17 defines a plurality of openings, not shown, through which bolts (not shown) pass to affix the end 12 to the vessel 23. The first end 12 of the housing 11 defines a first flushing liquid passage 25 and a second flushing liquid passage 26. Passages 25 and 26 communicate with space exterior to the housing 11 and exterior to the vessel 23. The lead line of the reference numeral 23 terminates generally adjacent the inner surface of the vessel. The first end 12 of the housing 11 defines an internal flush liquid passage 28. The passageway 16 at the portion of the end 12 remote from the vessel-engaging means has a region of greater diameter 16a into which is affixed a first or stationary portion 29 of a first mechanical seal 30. A second portion of the bellows mechanical seal 30 designated by the reference numeral 31 is affixed to a shaft 32 passing entirely through the passageway 16. The mechanical seal 30 has sealing and bearing faces in engagement designated by the reference numeral 34. The surfaces designated by the reference numeral 34 are disposed above and generally remote from the inner surface of the vessel 23. Adjacent the passage portion 16a is a second passage portion 16b of lesser diameter in which there is disposed a brass bushing 35 of greater diameter than the adjacent portion of the shaft 32. The bushing 35 serves to limit lateral motion of the shaft 32 and associated lateral motion of the sealing and rotating surfaces indicated by the reference numeral 34 during assembly. Adjacent the bushing 35 and remote from passage portion 16a is passage portion 16c which is a region of maximum diameter. Within the passage portion 16b is a second bellows seal 36. The seal 36 comprises a first or bellows portion 37 affixed to shaft 32 and a second or fixed portion 38 affixed to the central portion 14 of the housing 11. The end portion 12 and central portion 14 are effectively in liquid-tight engagement being sealed by an O-ring 39. The portion 38 of the bellows seal 36 is also in sealing engagement with the center portion 14 of the housing 11 by means of an O-ring 39. The bellows seal 36 is disposed on the shaft and housing in the same manner as the bellows seal 30. As depicted in the drawing, both bellows are resiliently tensioned in the same direction, i.e. towards the outer end 13. The bellows seal 36 has rotating and sealing surfaces indicated by the reference numeral 41. A self-aligning bearing 42 with associated oil seals is disposed within the passageway 16 partially within the end 13 and partially within the central portion 14 of the housing 11. Drain ports 44 and 45 are disposed in the central portion 14 and in normal operation are closed by a pipe plug. The shaft 32 has affixed thereto a driving flange 46 which is maintained in position by bolts 47 of retainer plate 48 and a key 49. A brass bushing 51 is disposed within the end 13 in a portion of the passage 16 designated as 16d. This bushing is utilized primarily as throttle bushing in the event of seal failure.

The seal assembly 10 can generally be assembled by adding components in the order they appear in the drawing from the top down. The shaft 32 receives the seal portion 31. The first end 12 fitted with bushing 35 and seal portions 29 is placed on the shaft. Seal portion 37 of the second seal 36 is positioned on the shaft and locked in place by means of screws, not shown, through an opening 52 in the first end 12. A stop ring 54 is positioned on the shaft 32 and the central portion 14 having a second seal portion 38 with the appropriate O-rings in position is fitted over the shaft 32. The driving flange 46 is applied. The oil seals, shown but not numbered, beneficially are contained within the portions prior to assembly.

In operation of the shaft seal of the present invention, motive power is applied to the shaft 32 through the flange 46 and the working load connected to the opposite end of the shaft 32, for example, an agitator, stirring paddle or the like. Optionally, flushing fluid may be provided to either one of the passages 25 or 26 which acts as an inlet, the remaining passage acting as an outlet and fluid circulated within the regions of passageway 16 lying generally between the housing portion 14 and externally to the second bellows seal 36 and the annular portion enclosed by the first bellows seal 30.

A seal in accordance with the present invention has operated reliably with no appreciable leakage of material through the first seal such as the seal 30 into a flushing fluid flowing through the passages 25, 26 and 28 and the region passageway 16 generally within the first end 12. Such bellows seals are well known and commercially available, however, it is desired for maximum service that the sliding surfaces on the bellows seal should be of tungsten carbide.

As is apparent from the forgoing specification, the present invention is suceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A mechanical seal assembly for the transfer of rotary motion through the wall of a vessel, the assembly comprising a housing, the housing defining a vessel engaging means and a generally, centrally disposed passageway, the housing having a first or inner end and a second or outer end, the passage extending between the first and second ends in a direction generally normal to the vessel engaging means, a rotatable shaft disposed within the housing, a first bellows seal in operative engagement with the shaft and inner end of the housing, a second bellows seal disposed generally, centrally within the housing, the first and second bellows seals having the bellows supported on a shaft and both bellows resiliently tensioned in a like direction, a generally annular passage defined by the shaft and the housing extending between the two bellows seals, the housing defining fluid inlet and outlet means in communication with the annular passage, the inlet and outlet means being disposed generally between the vessel engaging means and the second end, a self-aligned bearing disposed generally adjacent the second end of the housing and rotatably supporting the shaft therein.

2. The seal assembly of claim 1 wherein the housing defines at least first and second flushing liquid passages communicating with space external to the housing and space between the bellows seals.

3. The seal assembly of claim 1 wherein the vessel engaging means is a generally circumferential flange.

* * * * *